United States Patent [19]

Silverman

[11] Patent Number: 4,513,979

[45] Date of Patent: Apr. 30, 1985

[54] MACHINE TOOL WITH CHUCKING CONTROLS

[75] Inventor: Martin L. Silverman, South Euclid, Ohio

[73] Assignee: The Warner & Swasey Company, Cleveland, Ohio

[21] Appl. No.: 478,566

[22] Filed: Mar. 24, 1983

[51] Int. Cl.³ .................... B23B 31/30; F15B 13/042
[52] U.S. Cl. ......................................... 279/4; 91/420; 91/437; 91/464
[58] Field of Search .................... 279/4, 2 A; 91/420, 91/1, 166, 464, 437

[56] References Cited

U.S. PATENT DOCUMENTS

| | | | |
|---|---|---|---|
| 3,730,539 | 5/1973 | Swanson | 279/4 |
| 3,735,670 | 5/1973 | Smithson | 279/4 X |
| 3,771,802 | 11/1973 | Hiramatu et al. | 279/4 |
| 3,807,175 | 4/1974 | Kubik | 91/420 X |
| 3,895,560 | 7/1975 | Anderson | 91/1 |
| 3,908,383 | 9/1975 | Selden | 279/4 |
| 3,986,437 | 10/1976 | Lioux | 91/420 X |
| 4,221,160 | 9/1980 | Selden | 279/4 X |
| 4,250,794 | 2/1981 | Haack et al. | 91/420 |
| 4,281,584 | 8/1981 | Onken et al. | 91/1 |
| 4,314,502 | 2/1982 | Brinkel et al. | 91/464 X |
| 4,414,871 | 11/1983 | Trout | 279/4 X |

FOREIGN PATENT DOCUMENTS 40697 12/1981 European Pat. Off. ................ 279/4

Primary Examiner—William R. Briggs
Attorney, Agent, or Firm—Howard G. Massung; Raymond J. Eifler

[57] ABSTRACT

An improved machine tool has a chuck assembly which is actuated by a piston and cylinder type motor assembly. When a workpiece is to be gripped by the chuck assembly, high pressure fluid is directed to one chamber of the piston and cylinder motor and is exhausted from the opposite chamber. When the chuck assembly has gripped a workpiece, relative movement between the piston and cylinder is interrupted and fluid is no longer discharged from the motor. A pressure responsive switch assembly detects the reduction in the rate of the flow of fluid from the motor to provide a signal to indicate that a workpiece has been firmly gripped by the chuck assembly. After an initial machining operation in which relatively high forces are applied to the workpiece, such as during a rough cutting operation, the chucking forces applied to the workpiece are reduced prior to initiation of a finish cutting operation. This is accomplished by increasing the fluid pressure in the low pressure motor chamber to a pressure which is slightly less than the pressure in the high pressure chamber of the motor. Once this has been done, the pressures in both chambers of the motor are simultaneously reduced at the same rate until the desired pressure is obtained in the high pressure chamber.

6 Claims, 6 Drawing Figures

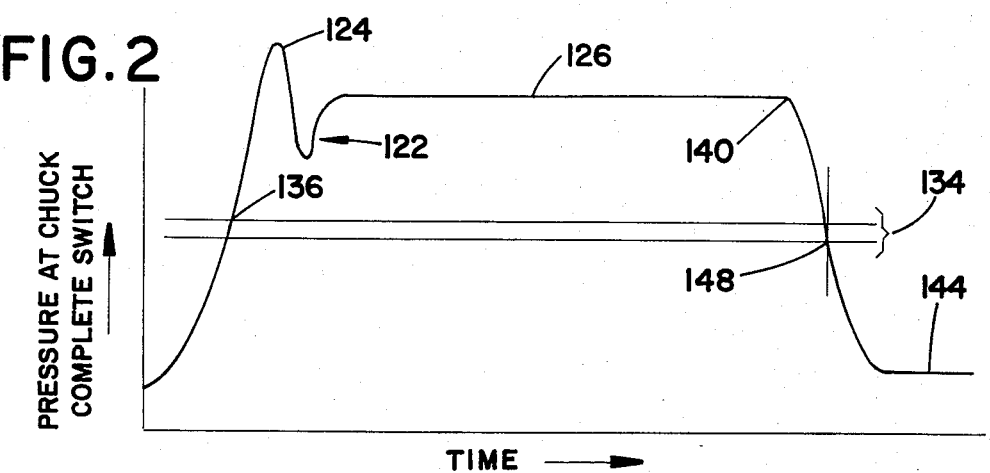
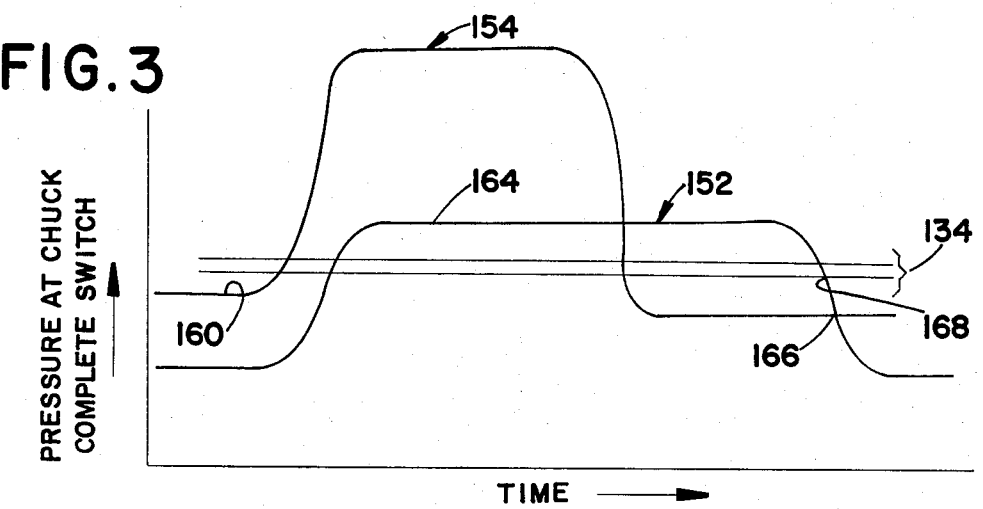
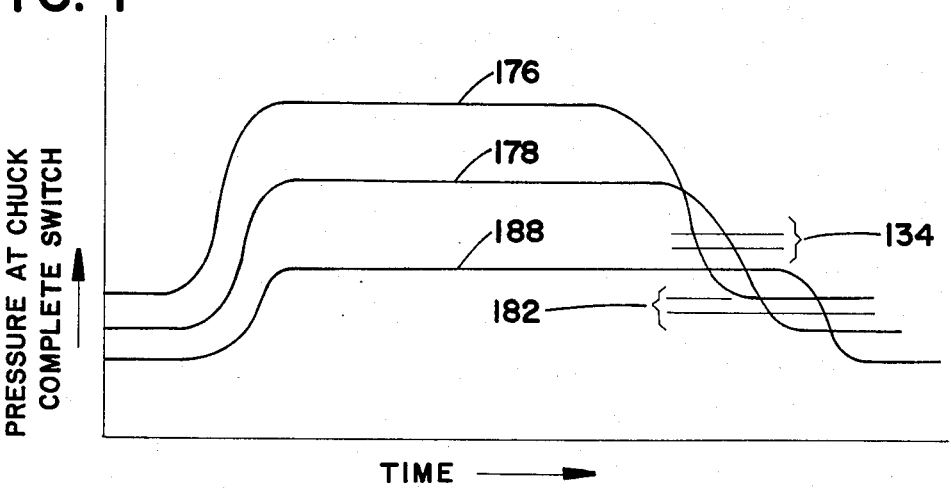

MACHINE TOOL WITH CHUCKING CONTROLS

BACKGROUND OF THE INVENTION

The present invention relates to a new and improved machine tool having a chuck which grips a workpiece during a machining operation.

Many known machine tools have chucks which are actuated by hydraulic motors to grip workpieces. The time required to actuate the chuck to grip a workpiece will vary as a function of the size of the workpiece and the fluid pressure used to operate a chuck actuator motor. Due to the different time periods required to actuate the chuck under different operating conditions, the machine tool controls have previously been programmed to provide sufficient time to close the chuck under the most adverse circumstances, that is when chuck jaw travel is a maximum and chuck actuator motor pressure a minimum. Of course, this results in the providing of an excessive amount of time for chuck actuation under conditions which require less time.

During the machining of a workpiece, there may be rough and finish cutting operations. During a rough cutting operation, relatively large forces are applied to the workpiece by a cutting tool so that a chuck must grip the workpiece with relatively large jaw forces. When a finish cutting operation is to be undertaken, the operating forces on the workpiece will be less and therefore the chuck jaw forces can be reduced.

Reducing the chuck jaw forces before undertaking a finish cutting operation tends to reduce the extent to which the workpiece is deformed by the chuck. For example, when thin tubular stock is to be machined, the relatively large chuck jaw forces used during a rough cutting operation may elastically deform the workpiece. If these chuck jaw forces are maintained during the finish cutting operation, the workpiece tends to spring back when released by the chuck jaws. This decreases the accuracy with which the workpiece is machined.

BRIEF SUMMARY OF THE PRESENT INVENTION

The present invention provides new and improved controls for machine tool chucking operations. In order to minimize machine tool operating time required for chucking operations, the controls detect when a chucking operation has been completed so that the machine tool can immediately proceed with the next operation. When the chuck is to grip a workpiece, a fluid motor is operated to move the jaws of the chuck into firm gripping engagement with the workpiece. As the motor is operated, fluid is discharged from a contracting chamber of the motor. When the chucking operation is completed and the motor stops operating, the fluid flow decreases. A detector assembly detects when a chucking operation has been completed by detecting when the fluid flow from the chuck actuator motor is reduced as the motor stops operating.

The chuck grips the workpiece with a relatively high force during a first machining operation and a relatively low force during a second machining operation. In order to reduce the force with which the chuck grips the workpiece while the chuck maintains a secure grip on the workpiece, the pressure differential across the piston of the chuck actuator motor is reduced by increasing the pressure in a low pressure motor chamber to a pressure which is slightly less than the pressure in a high pressure motor chamber. The pressures in the two motor chambers are then simultaneously decreased at the same rate until the pressure in the high pressure chamber, when unopposed, will cause the chuck jaws to grip the workpiece with the desired reduced force. The fluid pressure in the low pressure chamber is then further reduced to drain pressure so that the chuck jaws grip the workpiece with the desired reduced force. This is accomplished without releasing the workpiece.

Accordingly, it is an object of this invention to provide a new and improved machine tool having chuck controls which minimize machine tool idle time and which enable the force with which a workpiece is gripped to be accurately controlled.

Another object of this invention is to provide a new and improved machine tool having controls for detecting when a chuck has gripped a workpiece.

Another object of this invention is to provide a new and improved machine tool wherein the force with which the jaws of chuck grip a workpiece is reduced by reducing the fluid pressure in a chamber of a chuck actuator motor directly from a relatively high pressure to a lower pressure.

BRIEF DESCRIPTION OF THE DRAWINGS

The foregoing and other objects and features of the present invention will become more apparent upon a consideration of the following description taken in connection with the accompanying drawings wherein:

FIG. 2 is a graph indicating the manner in which the pressure of fluid discharged from a chuck actuator motor varies during operation of a chuck to grip a workpiece;

FIG. 3 is a graph, generally similar to FIG. 2, illustrating the relationship between a single pressure responsive switch assembly and chuck actuator motor discharge pressures during operation of the motor under the influence of high and low fluid pressures;

FIG. 4 is a graph, generally similar to FIG. 3, illustrating the relationship between high and low pressure responsive switch assemblies and chuck actuator motor discharge pressures during operation of the motor under the influence of high and low fluid pressures;

DESCRIPTION OF ONE SPECIFIC PREFERRED EMBODIMENT OF THE INVENTION

General Description

Figure 1:
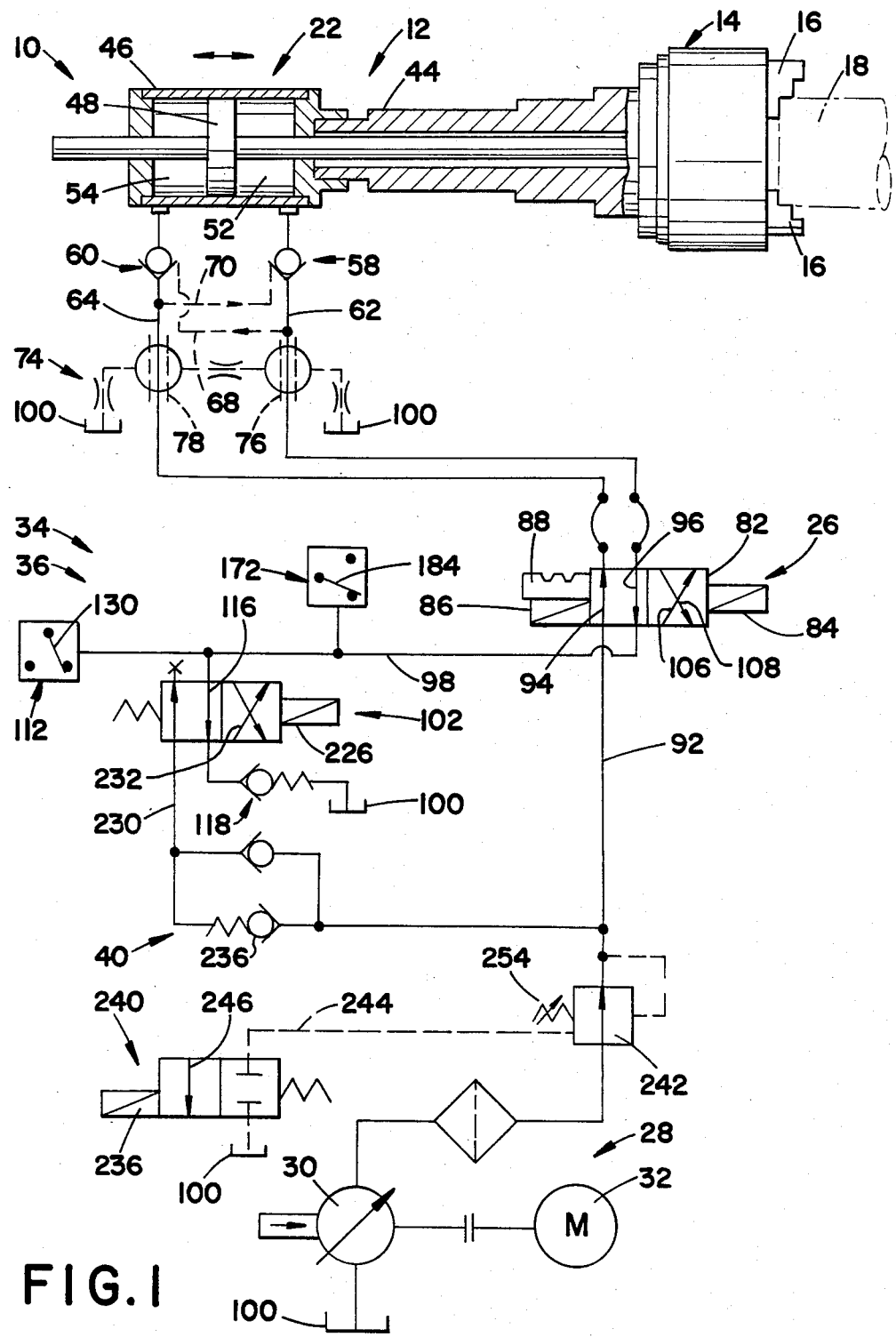
FIG. 1 is a schematic illustration of a machine tool having chucking controls constructed in accordance with the present invention.

A machine tool 10 constructed in accordance with the present invention includes a spindle assembly 12 of a known construction. The spindle assembly 12 includes chuck 14 having jaws 16 to grip a workpiece 18 which is to be rotated by the spindle assembly. The chuck 14 is actuated by a fluid motor 22.

When the chuck 14 is to grip the outer side surface of the workpiece 18, in the manner shown in FIG. 1, the motor 22 is actuated to move the jaws 16 inwardly from a fully open condition toward a fully closed condition until the jaws engage the outside of the workpiece 18. Similarly, if the chuck 14 is to grip the inside of a hollow workpiece, the motor 22 is actuated to move the jaws 16 outwardly from a fully open condition toward a fully closed condition until the jaws engage the inside of the workpiece. The chuck actuator motor 22 has the same general construction as the chuck actuator motor disclosed in U.S. Pat. No. 3,972,537.

A directional control valve 26 controls the direction of operation of the chuck actuator motor 22. The directional control valve 26 is connected with a source 28 of fluid under pressure. The fluid pressure source 28 includes a variable displacement pump 30 which is driven by a motor 32. By varying the maximum pressure setting of the pump 30, the rate at which fluid is discharged from the pump is varied due to less pressure available to overcome line losses. Of course, a fixed displacement pump with a pressure relief valve could be substituted for the variable displacement pump 30 if desired.

Improved chucking controls 34 include a chucking complete detector system 36 which, in accordance with one feature of the invention, detects when a workpiece 18 has been firmly gripped by the jaws 16 of the chuck 14. When the workpiece 18 has been firmly gripped, the chucking complete system 36 provides an output signal so that the next succeeding step in the operation of the machine tool 10 can be undertaken with a minimum of machine tool idle time. The chucking complete system 36 also provides an output signal when the chuck 14 has been operated to either a fully open or a fully closed condition.

In accordance with another feature of the present invention, the chucking controls 34 also includes a chucking force control system 40 to reduce the force with which the chuck 14 grips the workpiece 18 while the chuck continuously grips the workpiece. During a machining operation in which relatively large forces are applied to the workpiece 18, such as during a rough cutting operation, chuck jaws 16 apply relative large forces against the workpiece to firmly grip the workpiece. Prior to initiation of a subsequent machining operation in which relatively low forces are applied to the workpiece 18, such as during a finish cutting operation, the forces with which the jaws 16 of the chuck 14 grip the workpiece 18 are reduced. By reducing the forces with which the chuck jaws 16 grip the workpiece 18, elastic deformation of the workpiece is minimized to thereby promote the accurate machining of the workpiece.

Spindle Assembly

The spindle assembly 12 grips and rotates the workpiece 18 in a known manner. During rotation of the workpiece 18, the chuck actuator motor 22 continuously applies force to an actuator rod 44 to press the chuck jaws 16 firmly against the workpiece 18. The chuck actuator motor 22 includes a rotatable cylinder 46 in which a circular piston 48 is disposed. Although the piston 48 is movable relative to the cylinder 46 to actuate the chuck 14, it is contemplated that the cylinder could be moved relative to the piston if desired.

When the outside of a workpiece 18 is to be gripped by the jaws 16, the piston 48 is first moved to the right (as viewed in FIG. 1) in the motor cylinder 46 to force the chuck jaws 16 radially outwardly to a fully open condition. The workpiece 18 is then positioned between the fully open jaws 16. Pressurized fluid is then conducted to a right motor cylinder chamber 52 to close the jaws 16 on the workpiece 18.

In closing the jaws 16 on the workpiece 18, the fluid pressure in the right motor cylinder chamber 52 causes the piston 48 to move toward the left (as viewed in FIG. 1) to decrease the size of a left motor cylinder chamber 54 and discharge fluid from the motor 22. As the piston 48 moves leftwardly (as viewed in FIG. 1), the jaws 16 move inwardly into abutting engagement with the workpiece 16. When the jaws 16 have firmly gripped the outer side surface of the workpiece 18, the leftward movement of the piston 48 under the influence of the pressure in the right motor cylinder chamber 52 stops and the chucking operation is completed. The fluid pressure in the right motor cylinder chamber 52 maintains the jaws 16 in firm gripping engagement with the workpiece 18 as it is rotated by the spindle assembly 12.

When the chuck 14 is to be actuated to grip the inside of a workpiece, the directional control valve assembly 26 is first actuated to direct pressurized fluid to the right motor cylinder chamber 52 to move the chuck jaws 16 to a fully open condition in which the chuck jaws are disposed adjacent to the center of the chuck 14. Once the hollow workpiece has been telescoped over the chuck jaws 16, the directional control valve 26 is actuated to port high pressure fluid to the left motor cylinder chamber 54. This causes the piston 48 to move toward the right to move the chuck jaws 16 radially outwardly.

As the piston 48 moves toward the right (as viewed in FIG. 1), fluid is discharged from the motor cylinder chamber 52. When the chuck jaws 16 have moved into firm abutting engagement with the inside surface of the workpiece, the rightward movement of the piston 48 is interrupted. The fluid pressure in the left motor cylinder chamber 54 holds the chuck jaws 16 in firm abutting engagement with the inside of the workpiece as it is rotated by the spindle assembly 12.

A pair of check valve assemblies 58 and 60 are provided in conduits 62 and 64 which conduct fluid to and from the motor cylinder chambers 52 and 54. The check valve assemblies 58 and 60 block fluid flow from the motor cylinder chambers 52 and 54 in the event of a pressure failure during a machining operation. This results in the chuck jaws 16 being held in firm abutting engagement with the workpiece 18 by the high pressure fluid in one of the motor chambers 52 or 54. Thus, if the jaws 16 were in abutting engagement with the outside of a workpiece 18 as shown in FIG. 1, pressurized fluid would be trapped in the motor cylinder chamber 52 by the check valve assembly 58 in the event of a loss of pressure from the pump 30. Similarly, if the jaws 16 were in abutting engagement with the inside of a workpiece, high pressure fluid would be trapped in the motor cylinder chamber 54 by the check valve assembly 60 in the event of a loss of pressure from the pump 30.

During operation of the chuck actuator motor 22, fluid under pressure is conducted to an expanding motor cylinder chamber and is exhausted from the contracting motor cylinder chamber. In order to enable fluid to be exhausted from the contracting motor cylinder chamber, pilot pressure lines 68 and 70 are provided to conduct fluid pressure to actuate the check valve assemblies 58 or 60 to an open condition.

If high pressure fluid is being conducted through the conduit 62 to the motor cylinder chamber 52, the high pressure fluid would be transmitted through the pilot line 68 to the check valve assembly 60 to open the check valve assembly. Fluid could then be exhausted from the contracting motor cylinder chamber 54. Similarly, if high pressure fluid was being conducted through the conduit 64 to the motor cylinder chamber 54, the relatively high pressure in the conduit 64 would be transmitted through the pilot line 70 to open the check valve assembly 58. Fluid could then be exhausted from the contracting motor cylinder chamber 52.

A runner gland assembly 74 is provided to transmit the fluid flow from a stationary base of the machine tool 10 to the rotating spindle assembly 12. The runner gland assembly 74 is of a known construction. and includes annular lands and manifold rings which have been indicated schematically at 76 and 78 in FIG. 1. The lands conduct pressurized fluid from the directional control valve 26 to the conduits 62 and 64 and conduct fluid exhausted from the motor 22 back to the directional control valve. The general construction of the chuck actuator motor 22, check valve assemblies 58 and 60 and runner gland assembly 74 is the same as is shown in U.S. Pat. No. 3,972,537.

The directional control valve 26 has a spool 82 which is actuated by a pair of solenoids 84 and 86. A detent arrangement 88 is provided to hold the directional control valve 26 in a position to which it is actuated by the solenoids 84 and 86.

When the directional control valve 26 is in the position shown in FIG. 1, pressurized fluid from a main supply conduit 92 is conducted through a valve spool passage 94 to the conduit 64 and motor cylinder chamber 54. At the same time, fluid exhausted from the motor cylinder chamber 52 is conducted through the conduit 62 and valve spool passage 96 to a conduit 98 which is connected with reservoir 100 through a back pressure valve 102. Upon actuation of the directional control valve 26, pressurized fluid is conducted from the conduit 92 through a passage 106 to the conduit 62 and motor cylinder chamber 52. At this time, fluid exhausted from the motor cylinder chamber 54 is conducted through the conduit 64 and valve passage 108 through the drain conduit 98 to the reservoir 100.

Chucking Complete Detector System

The chucking complete detector system 36 detects when the chuck 14 has firmly gripped a workpiece 18 or when the chuck has been operated to either a fully open or fully closed condition. The time which is required for the chuck 14 to grip a workpiece will depend, in part, upon the distance through which the motor 22 has to move the jaws 16. Of course, the greater the distance through which the jaws 16 have to move to grip a workpiece, the greater is the time required to grip the workpiece.

In the absence of chuck or top jaw adjustment, the smaller the outside diameter of the workpiece 18, the greater is the distance which the jaws 16 are moved inwardly from the their fully open positions and the greater the distance which the piston 48 is moved from an initial end of stroke position. Similarly, the greater the size of the opening in an internally gripped workpiece, the greater is the distance which the jaws 16 are moved outwardly from their fully open positions and the greater the distance which the piston 48 is moved. Thus, the chuck 14 is operable to any one of a plurality of gripping conditions disposed between a fully open condition and a fully closed condition depending upon the size of the workpiece being gripped, and the manner in which the workpiece is gripped.

The time required for the chuck 14 to grip the workpiece 18 will also vary as a function of variations in the fluid pressure conducted to the motor 22 from the pump 30. If the output pressure from the pump 30 is relatively high, the resulting relatively large pressure differential across the piston 48 causes the piston to move faster to actuate the chuck 14 and grip the workpiece. However, if the output pressure from the pump 30 is relatively low, the pressure differential across the piston 48 is relatively small and a longer period of time is required to actuate the chuck 14.

In order to enable the machine tool 10 to grip a workpiece and proceed on to the next succceeding step as soon as possible, the chucking complete detector system 36 provides an output signal as soon as the chuck jaws 16 have firmly gripped the workpiece 18. The chucking complete detector system 36 includes a pressure responsive detector unit 112 which is connected in fluid communication with the drain conduit 98.

When a chucking operation has been completed, the piston 48 no longer moves in the cylinder 46 and the flow of fluid from the motor 22 is interrupted. This results in a drop in the pressure in the drain conduit 98. The drop in pressure causes the detector unit 112 to provide an output signal to a control unit (not shown) for the machine tool 10. The machine tool 10 undertakes the next succeeding operation as soon as the control unit receives a signal from the detector unit 112 indicating that a chucking operation has been completed.

When a chucking operation is to be undertaken to grip the outside of a workpiece 18 with the jaws 16, the piston 48 is moved to the right end of the cylinder 46. At this time the directional control valve 26 is in the position shown in FIG. 1 directing high pressure fluid to the motor cylinder chamber 54. After the workpiece 18 has been positioned relative to the jaws 16 of the chuck 14, the directional control valve 26 is actuated.

Actuation of the directional control valve 26 ports pressurized fluid from the supply conduit 92 through the valve passage 106, conduit 62, and check valve assembly 58 to the motor cylinder chamber 52. The pressurized fluid in the conduit 62 is conducted through the pilot passage 68 to actuate the check valve assembly 60 to an open condition. Therefore, the motor cylinder chamber 54 is connected in fluid communication with drain conduit 98 through the now open check valve assembly 60, conduit 64 and valve passage 108.

The resulting pressure differential across the piston 48 causes the piston to move toward the left (as viewed in FIG. 1) under the influence of the fluid pressure in the motor cylinder chamber 52. This leftward movement of the piston 48 causes fluid to be exhausted from the motor cylinder chamber 54 to the drain conduit 98.

The drain conduit 98 is connected with the back pressure valve 102 which is now in the position shown in FIG. 1. A passage 116 in the back pressure valve 102 is connected in fluid communication with a spring biased check valve assembly 118. The spring biased check valve assembly 118 is opened under the influence of a relatively low fluid pressure, for example 15 psi, to connect the drain conduit 98 with the reservoir 100.

As the piston 48 starts to move in the cylinder 46, the pressure in the drain conduit 98 will vary in the manner indicated by the line 122 in the graph of FIG. 2. Thus, upon initial actuation of the directional control valve 26, there will be transient fluid pressure fluctuations, indicated schematically at 124 in FIG. 2, as the piston 48 and chuck jaws 16 start to move.

After the initial inertia and friction forces have been overcome, the rate of movement of the piston 48 and the rate at which fluid is discharged from the motor cylinder chamber 54 remain substantially constant. Therefore, the pressure in the drain conduit 98 will be substantially constant in the manner indicated by the portion 126 of the line 122 in FIG. 2. The build up of pressure in the conduit 98 is the result of the restricting influence of the passage 116 in the back pressure control valve 102, the spring biased check valve 118, and line losses.

As the piston 48 starts to move and the fluid pressure in the drain conduit 98 increases, a switch 130 in the pressure responsive detector unit 112 is actuated. Ignoring the transient pressure fluctuations 124 (FIG. 2) at the start of movement of the piston 48, the switch 130 is actuated when the fluid pressure in the conduit 98 crosses the high side of a pressure band 134, that is, at the point indicated at 136 in FIG. 2. The pressure band 134 is a dead or nonresponsive zone in which the condition of the switch 130 is not changed by the pressure in the conduit 98 entering the zone. Normally the width of the pressure zone or band 134 is between 1 and 5 psi. Of course, the width of the nonresponsive pressure band will depend upon the particular construction of the switch 130 and pressure responsive detector unit 112.

The switch 130 remains actuated as long as the fluid pressure in the drain conduit 98 remains above the lower side of the pressure band 134. Therefore, the switch 130 remains actuated until the chuck jaws 16 firmly grip the workpiece 18 and the piston 48 stops moving relative to the cylinder 46. Of course, in the absence of a workpiece, the piston 48 would stop moving when the chuck 14 is actuated to either a fully open or a fully closed condition. The point at which the piston 48 stops moving is indicated at 140 in FIG. 2. Once the piston 48 stops moving, sufficient fluid flows through the check valve 116 to the reservoir 100 to cause the fluid pressure in the drain conduit 98 to drop to a relatively low back pressure, for example 15 psi, indicated at 144 in FIG. 2.

As the pressure in the drain conduit 98 drops, the pressure will cross the low side of the band 134, at the point indicated at 148 in FIG. 2, with a resulting actuation of the switch 130. Actuation of the switch 130 indicates to the machine tool controls that the chucking operation has been completed and that the next succeeding step in the operating cycle of the machine tool can be undertaken.

The pressure transmitted from the pump 30 to the chuck actuator motor 22 will vary depending upon the force with which the chuck jaws 16 are to be pressed against the workpiece 18. The greater the chuck jaw force required to hold the workpiece, the greater will be the fluid pressure transmitted to the motor 22.

Increasing the fluid pressure conducted to the motor 22 increases the speed at which the piston 48 moves in the cylinder 46. Increasing the speed movement of the piston 48 increases the rate at which fluid is discharged from the motor 22 and the pressure which builds up in the drain conduit 98. Thus, when there is a relatively low output pressure from the pump 30, for example 150 psi, the piston 48 will move slowly relative to the cylinder 46. The back pressure in the conduit 98 will vary in the manner indicated by the lower curve 152 in FIG. 3.

When there is a relatively high output pressure from the pump 30, for example 850 psi, the speed of movement of the piston 48 in the cylinder 46 is increased. This results in an increase in the rate at which fluid is discharged from the motor 22 with a resulting increase in the back pressure in the line 98. The back pressure in the conduit 98 will then vary in the manner indicated by the upper curve 154 (FIG. 3). It should be understood that the transient pressure fluctuations which occur upon initial movement of the piston 48 have been omitted from FIG. 3 for purposes of clarity of illustration.

In order for the pressure responsive detector unit 112 to respond to both relatively high and low pressure actuation of the motor 22, the switch 130 is adjusted so that its nonresponsive or dead band 134 is above the relatively high initial or drain pressure, indicated at 160 in FIG. 3, which is present when the pump 30 has a relatively high pressure output. In addition, the switch 130 is adjusted so that the nonresponsive band 134 is below the relatively low constant pressure portion 164 which is obtained when the pump 30 has a relatively low pressure output.

Since the high pressure chucking operation takes less time than the low pressure chucking operation, the switch 130 is actuated at the point indicated at 166 in FIG. 3 upon completion of a chucking operation in which the motor 22 is operated under relatively high fluid pressure. Similarly, the switch 130 is actuated at the point indicated at 168 in FIG. 3 upon completion of a chucking operation in which the motor 22 is operated under the influence of a relatively low fluid pressure.

There is a relatively small range of pressures in which the nonresponsive or dead band 134 for the switch 130 can be located so that the detector unit 112 can be respond satisfactorily during both high and low pressure chucking operations. In one specific instance, the width of the range in which the nonresponsive band 134 could be located was approximately 8 psi. Since the nonresponsive band 134 may have a width of 1 to 5 psi, the 8 psi range for locating the nonresponsive band 134 is relatively small and could lead to difficulty in adjusting the machine tool 10 for satisfactory operation with hydraulic fluids of different viscosities and different temperature responsive characteristics.

To facilitate high and low pressure operation of the motor 22, the pressure detector unit 112 is adjusted to respond only to relatively high pump operating pressures. A second detector unit 172 (FIG. 1) is used to respond to relatively low pressure operation of the motor 22. By using two detector units 112 and 172, there is a relatively large range of adjustment for the pressure responsive switches in each unit.

The high pressure range of motor operation is selected as being between the lines 176 and 178 in FIG. 4. The switch 130 in the high pressure detector unit 112 is adjusted so that the nonresponsive band 134 is positioned relative to the lines 176 and 178 in the manner shown in FIG. 4. Similarly, a nonresponsive band 182 for a switch 184 in the low pressure detector unit 172 is adjusted so that it is located in the position shown in FIG. 4 for a low pressure chucking range between the lines 178 and 188. During low pressure chucking operations, output signals from the detector unit 112 are monitored but ignored by the machine tool controls. Similarly, during high chucking operations, output signals from the detector unit 172 are monitored but ignored by the machine tool controls.

Chucking Force Control

During operation of the machine tool 10, it is contemplated that it may be desired to reduce the force with which the chuck 14 grips the workpiece 18 part way through the process of machining the workpiece. For example, after a rough cutting operation has been completed, it may be desired to reduce the forces which the chuck jaws 16 apply against the workpiece 18 prior to undertaking a finish cutting operation. Of course, reducing the force which the chuck jaws 16 apply against the workpiece 18 reduces the extent to which the workpiece is elastically deformed by the jaws. In order to reduce overall part cycle time and operator involvement, the chuck jaws 16 continuously grip the workpiece 18 while the force which the chuck jaws apply against the workpiece is reduced.

In order to reduce the force which the chuck jaws 16 apply against the workpiece 18, it is necessary to reduce the pressure differential across the piston 48 to a very low pressure differential. This is because even a moderate size pressure differential across the piston 48 is effective to maintain chucking jaw forces which were previously established. Thus, the jaws 16 do not relax their grip until there is a very small pressure differential across the piston 48.

Figure 5:
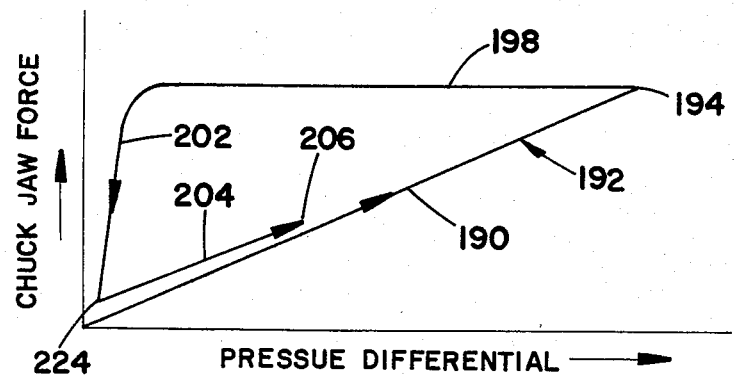
FIG. 5 is a graph illustrating how the force applied against a workpiece by the jaws of a chuck varies with variations in the pressure differential across a piston of a chuck actuator motor.

The manner in which the chuck jaw force varies with variations in the pressure differential across the piston 48 is shown schematically in FIG. 5. Upon initial closing of the jaws 16 to grip the outside of the workpiece 18, the increasing pressure in the right motor cylinder chamber 52 results in an increasing pressure differential across the piston 48. This results in a corresponding increase in the force applied against the workpiece 18 by the jaws 16 of the chuck, as shown by the portion 190 of the curve 192 (FIG. 5). The jaw force increases until the jaws 16 are pressed against the workpiece with the desired force indicated at the point 194 in FIG. 5. At this time, the relatively high chuck jaw forces are sufficient to hold the workpiece 18 during a rough cutting operation.

After the workpiece has stopped rotating at the end of the rough cutting operation, the fluid pressure differential across the piston 48 is reduced, in the manner indicated by the line 198 in FIG. 5. However, the chuck jaw force remains substantially constant. This is because once the jaws 16 of the chuck 14 have been engaged with a relatively large force, the mechanism in the chuck tends to lock up and hold the jaws in place with the same gripping force even though the fluid pressure differential across the piston 48 of the motor 22 is reduced.

As the pressure differential across the piston 48 is decreased, the chuck jaw gripping force remains constant until a relatively small pressure differential is reached. The chuck jaw force then decreases with a small change in the pressure differential, in the manner indicated by the line 202 in FIG. 5. The pressure differential across the piston 48 can then be increased to press the chuck jaws 16 against the workpiece 18 with an increasing force in the manner indicated by the line 204 in FIG. 5. Once a desired chuck jaw pressure has been reached, that is at the point 206 in FIG. 5, the pressure differential across the piston 48, is maintained constant to maintain the chuck jaw force constant.

If the pressure differential across the piston 48 and the chuck jaw force applied against the workpiece 18 is to be reduced by decreasing the pressure in the conduit 62 and motor cylinder chamber 52, a separate actuator circuit will have to be provided to hold the check valve assembly 58 open. Thus, the relatively high operating pressure in the chamber 52 would close the check valve assembly 58 as soon as the pressure in the conduit 62 is reduced. The check valve assembly 58 can only be opened by providing a separate actuator circuit or by actuating the directional control valve 26 to reverse the direction of operation of the motor 22. Reversing the direction of operation of the motor 22 can result in the workpiece 18 being released from the chuck 14.

According to a feature of the present invention, the force applied against the workpiece 18 by the chuck jaws 16 is decreased and the pressure differential across the piston 48 is decreased by increasing the fluid pressure in the motor chamber 54 to a transition pressure which is somewhat less than the high pressure in the motor chamber 52. This results in the check valve assembly 58 being held open by the transition fluid pressure transmitted through the pilot fluid passage 70 when the pressure in the conduit 64 is a predetermined function of the pressue in the conduit 62. In one specific instance, the pressure in the conduit 64 had to be at least one third of the pressure in the conduit 62 to open the check valve assembly 58.

As the fluid pressure conducted through the conduit 64 to the motor cylinder chamber 54 increases, the check valve assembly 58 is held open under the influence of fluid pressure conducted through the pilot passage 70. Once the pressure differential across the piston 48 has been decreased to a very small amount by increasing the pressure in the motor cylinder chamber 54 to the transition fluid pressure, the pressures in both of the motor cylinder chambers 52 and 54 are simultaneously reduced at the same rate. This decreases the pressure in the motor cylinder chamber 52 directly to a pressure which is sufficient to cause the chuck jaws 16 to apply the desired force to the stationary workpiece 18 when the motor cylinder chamber 54 is at drain or minimum pressure. The fluid pressure in the opposite motor cylinder chamber 54 is then decreased to drain or minimum pressure to establish a pressure differential across the piston 48 sufficient to press the chuck jaws 16 against the workpiece 18 with the desired force.

Figure 6:
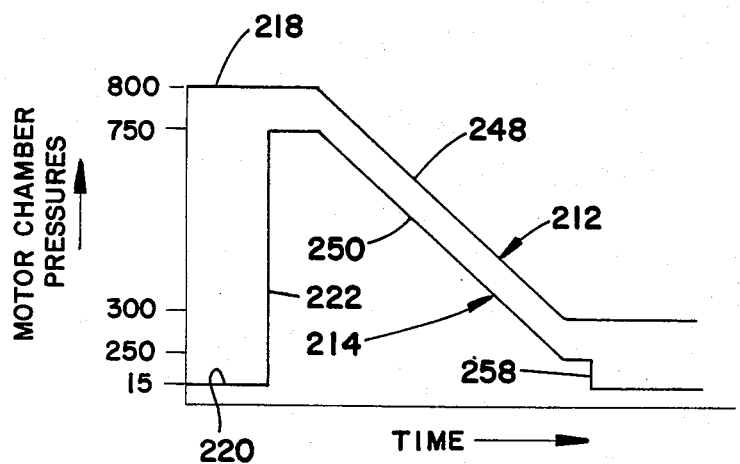
FIG. 6 is a graph schematically illustrating the manner in which the pressures in high and low pressure chambers of the chuck actuator motor are varied by the chucking controls of FIG. 1 to reduce the force applied by the jaws of the chuck against a workpiece.

The manner in which the fluid pressures in the two motor cylinder chambers 52 and 54 were varied to decrease the force applied against the stationary workpiece 18 by the chuck jaws 16 the end of the rough cutting operation is shown by the graph of FIG. 6. In FIG. 6 the curve 212 indicates the manner in which the fluid pressure is varied in the right motor cylinder chamber 52. The curve 214 indicates the manner in which the pressure is varied in the left motor cylinder chamber 54.

Assuming that the chuck jaws 16 are gripping the workpiece 18 with a relatively large force during a machining operation, such as a rough cutting operation, there will be a relatively high fluid pressure, indicated at 218 in FIG. 6, in the motor cylinder chamber 52. At this time, the check valve assembly 60 is open under the influence of pilot fluid pressure conducted through the line 68. Therefore, the left motor cylinder chamber 54 is vented to reservoir through the drain conduit 98 and back pressure control valve 102. Thus, there will be a relatively low pressure, indicated at 220 in FIG. 6, in the motor chamber 54. In one specific instance, the pressure in the right motor cylinder chamber 52 was 800 psi and the fluid pressure in the motor cylinder chamber 54 was 15 psi during the rough cutting operation.

In order to increase the fluid pressure in the left motor cylinder chamber 54 relative to the fluid pressure in the right motor cylinder chamber 52, in the manner indicated by the line 222 in FIG. 6, a solenoid 226 (FIG. 1) is energized to actuate the back pressure control valve 102. This connects the drain conduit 98 with a conduit 230 through a passage 232 in the back pressure control valve 102. The conduit 230 is connected with the main pressure supply conduit 92 through a spring biased check valve 236 which establishes a pressure differential between the conduits 92 and 230.

The pressure reducing valve 236 reduces the pressure in the main supply conduit 92 by a preselected amount and transmits the reduced pressure to the conduit 230. Thus, in the specific instance illustrated in FIG. 6, the pressure reducing valve 236 reduced the main supply conduit pressure by 50 psi from 800 psi to 750 psi. The 750 psi pressure in the conduit 230 was conducted through the back pressure control valve 102 to the actuated directional control valve 26. This transition pressure was transmitted through the valve passage 108 to the conduit 64 and the left motor cylinder chamber 54.

Therefore, actuating the back pressure control valve 102 results in a rapid increase in the fluid pressure in the chamber 54, to the transition pressure of approximately 750 psi, in the manner illustrated by the line 222 in FIG. 6. At this time, the pressure differential across the piston 48 is 50 psi. The 50 psi transition pressure differential across the piston 48 is sufficient to relax the chuck jaws 16 so that the jaw force is a transition force indicated by the point 224 in FIG. 5. It should be noted that the chuck jaws 16 still grip the workpiece even though the fluid pressure differential across the piston 48 has been reduced. Therefore, the workpiece is still securely held in the machine tool and the operator does not have to reposition the workpiece in the chuck jaws.

The pressure in the conduit 64 is transmitted through the pilot line 70 to the check valve assembly 58. Since the pressure in the conduit 64 has increased to the transition pressure of approximately 750 psi, it is sufficient to hold the check valve assembly 58 open against the pressure in the motor cylinder chamber 52. Therefore, at this time, both of the check valve assemblies 58 and 60 are open.

A solenoid 236 (FIG. 1) is then energized to actuate a control valve 240. Actuating the control valve 240 connects a drain line 244 for a pressure reducing valve 242 with reservoir through a valve passage 246. This results in a gradual reduction in the fluid pressure biasing force applied against the pressure reducing valve 242 and a corresponding reduction in the pressure in the main supply conduit 92.

Since the pressure in the main supply conduit 92 is transmitted through the pressure reducing valve 236 to the motor cylinder chamber 54 and to the motor cylinder chamber 52, the fluid pressures in both of the motor cylinder chambers 52 and 54 are simultaneously reduced at the same rate the pressure in the conduit 92 is reduced. The manner in which the fluid pressures in the two motor cylinder chambers 52 and 54 are reduced at the same rate is indicated by the lines 248 and 250 in FIG. 6. Since the pressures in the two motor cylinder chambers 52 and 54 are reduced at the same rate, the transition pressure differential across the piston 48 is maintained substantially constant, that is 50 psi, as the pressure in the two motor cylinder chambers 52 and 54 are reduced.

The pressure reducing valve 242 has an adjustable spring 254 (FIG. 1) which allows the valve to be set to reduce the pressure in the supply conduit 92 to a pressure corresponding to the force with which it is desired to have the jaws 16 grip the workpiece 18 during a finish cutting operation. In the embodiment of the invention illustrated by the graph of FIG. 6, the pressure reducing valve 242 was set to reduce the supply pressure in the conduit 92 to 300 psi. This results in the pressure reducing valve 236 reducing the fluid pressure transmitted to the motor cylinder chamber 54 to 250 psi. After this has been done, the back pressure control valve 102 is de-energized.

Upon deenergization of the back pressure control valve 102, the conduit 98 is again connected with reservoir 100 through the spring biased check valve 118. This results in the pressure in the chamber 54 being reduced to a relatively low pressure, for example 15 psi, in the manner indicated by the line 258 in FIG. 6. At this time the pressure differential across the piston 48 is sufficient to hold the chuck jaws 16 in firm gripping engagement with the workpiece 18 with a chuck jaw force indicated by the point 206 in FIG. 5.

It should be understood that although the foregoing description has related to the reducing of the chuck jaw force on the outside of the workpiece 18, the chucking force control system 40 can be used to reduce the force which the jaws 16 apply against an internally gripped workpiece. Of course, a chuck jaw force reduction while internally gripping a workpiece would require increasing the fluid pressure in the motor chamber 52 to reduce the pressure differential across the piston 48. It should also be understood that the foregoing specific operating pressures have been set forth only for purposes of clarity of illustration. It is not intended that the invention be limited to any specific operating pressures or ratio of operating pressures.

Conclusion

The present invention provides new and improved controls 34 for machine tool chucking operations. In order to minimize machine tool operating time required for chucking operations, the chucking complete detector system 36 detects when a chucking operation has been completed so that the machine tool 10 can immediately proceed with the next operation. Thus, when the chuck 14 is to grip a workpiece 18, a fluid motor 22 is operated to move the jaws 16 of the chuck into firm gripping engagement with the workpiece. As the motor 22 is operated, fluid is discharged from a contracting chamber of the motor. When the chucking operation is completed and the motor 22 stops operating, the fluid flow is decreased. One of the pressure responsive detector units 112 or 172 detects when the chucking operation has been completed by detecting the fluid pressure decrease which occurs when the fluid flow from the chuck actuator motor 22 is reduced as the motor stops operating.

The chuck 14 grips the workpiece 18 with a relatively high force during a first machining operation and a relatively low force during a second machining operation. In order to reduce the force with which the chuck 14 grips the workpiece 18 while the chuck maintains a secure grip on the workpiece, the pressure differential across the piston 48 of the chuck actuator motor 22 is reduced by increasing the pressure in the low pressure chamber, for example the chamber 54, to a pressure which is slightly less than the pressure in the high pressure motor chamber, for example the chamber 52. Although the pressure differential across the piston 48 is reduced, the chuck 14 maintains a secure grip on the workpiece. The pressures in the two chambers 52 and 54 are then simultaneously decreased at the same rate until the pressure in the high pressure chamber 52 is sufficient, when unopposed, to cause the chuck jaws 16 to grip the workpiece 18 with the desired reduced force. The fluid pressure in the low pressure chamber 54 is then reduced to drain pressure so that the chuck jaws 16 grip the workpiece 18 with the desired reduced force. The foregoing reduction in chuck jaw gripping force is obtained without releasing the workpiece 18.

Having described one specific preferred embodiment of the invention, the following is claimed:

1. A machine tool comprising chuck means for gripping a workpiece with a first force during a first machining operation and for gripping the workpiece with a second force which is less than the first force during a second machining operation, motor means having first and second motor chambers for holding fluid to effect operation of said chuck means to grip the workpiece with a force which varies as a function of a fluid pressure differential between said first and second motor chambers, said first motor chamber holding fluid at a first pressure during the first machining operation and holding fluid at a second pressure which is less than the first pressure during the second machining operation, said second motor chamber holding fluid at a minimum pressure which is less than the first and second pressures during the first and second machining operations, and chucking force control means for reducing the force with which said chuck means grips the workpiece from the first force to a transition force which is less than the second force while the first fluid pressure is present in said first motor chamber and for increasing the force with which said chuck means grips the workpiece from the transition force to the second force, said chucking force control means including pressure control means for increasing the fluid pressure in said second motor chamber from the minimum fluid pressure to a transition fluid pressure which is greater than the second fluid pressure and less than the first fluid pressure while the first fluid pressure is present in said first motor chamber and for simultaneously reducing the fluid pressures in said first and second motor chambers until the fluid pressure in said first motor chamber is equal to the second fluid pressure.

2. A machine tool as set forth in claim 1 further including first conduit means for transmitting fluid pressure to said first motor chamber, second conduit means for transmitting fluid pressure to said second motor chamber, first check valve means operable from an open condition to a closed condition to block fluid flow from said first motor chamber in the event of a reduction in fluid pressure in said first conduit means during the first and second machining operations, and means for maintaining said first check valve means in the open condition under the influence of the fluid pressure in said second conduit means during the reduction in the fluid pressure in said first motor chamber from the first fluid pressure to the second fluid pressure.

3. A machine tool as set forth in claim 1 wherein said pressure control means includes means for maintaining a fluid pressure differential between said first and second motor chambers substantially constant during the simultaneous reduction of the fluid pressures in said first and second motor chambers.

4. A machine tool as set forth in claim 1 wherein a transition fluid pressure differential is present between the fluid pressures in said first and second motor chambers when the first fluid pressure is present in said first motor chamber and the transition fluid pressure is present in said second motor chamber, said pressure control means including means for maintaining the transition fluid pressure differential between the fluid pressures in said first and second motor chambers during the simultaneous reduction in the fluid pressures in said first and second motor cylinder chambers, said pressure control means further including means for reducing the fluid pressure in said second motor chamber to the minimum fluid pressure after reducing the fluid pressure in said first motor chamber to the second fluid pressure.

5. A machine tool as set forth in claim 1 further including pump means for supplying fluid under pressure, motor control valve means for controlling operation of said motor means, first conduit means for conducting fluid flow between said motor control valve means and said first motor chamber, second conduit means for conducting fluid flow between said motor control valve means and said second motor chamber, third conduit means for conducting fluid flow from said pump means to said motor control valve means, and fourth conduit means for conducting fluid flow from said motor control valve means during operation of said motor means, said pressure control means including valve means for connecting said third conduit means in fluid communication with said fourth conduit means during operation of said motor means and for directing the transition fluid pressure to said fourth conduit means to effect the increase in the fluid pressure in said second motor chamber to the transition fluid pressure.

6. A method as set forth in claim 5 further including first detector means for detecting when said chuck means has gripped the workpiece during operation of said motor means under the influence of the first fluid pressure to operate said chuck means from an open condition to a closed condition, second detector means for detecting when said chuck means has gripped the workpiece during operation of said motor means under the influence of the second fluid pressure to operate said chuck means from the open condition to the closed condition, said first and second detector means being connected in fluid communication with said fourth conduit means which conducts fluid from said motor control valve means at a relatively high fluid pressure during operation of said motor means under the influence of the first fluid pressure and which conducts fluid from said motor control valve means at a relatively low fluid pressure during operation of said motor means under the influence of the second fluid pressure.

* * * * *